United States Patent [19]

Kriz

[11] Patent Number: 4,923,321

[45] Date of Patent: May 8, 1990

[54] FURNITURE CONNECTOR

[75] Inventor: Ulrich Kriz, Hard, Austria

[73] Assignee: Julius Blum Gesellschaft m.b.H., Höchst, Austria

[21] Appl. No.: 306,750

[22] Filed: Feb. 6, 1989

[30] Foreign Application Priority Data

Feb. 9, 1988 [AT] Austria .................................. 271/88

[51] Int. Cl.⁵ ............................................. F16B 12/20
[52] U.S. Cl. ....................................... 403/6; 403/231;
  403/407.1
[58] Field of Search .................. 403/407.1, 6, 20, 245,
  403/403, 231

[56] References Cited

U.S. PATENT DOCUMENTS

| 3,951,558 | 4/1976 | Komarov | 403/231 |
|---|---|---|---|
| 4,030,846 | 6/1977 | Flötotto | 403/231 |
| 4,047,822 | 9/1977 | Lehman | 403/245 |
| 4,131,376 | 12/1978 | Busse | 403/231 |
| 4,160,610 | 7/1979 | Austen-Brown et al. | 403/407.1 |
| 4,163,618 | 8/1979 | Giovannetti | 403/245 |
| 4,202,645 | 5/1980 | Giovannetti | 403/407.1 |
| 4,353,663 | 10/1982 | Glickman | 403/407.1 |
| 4,360,282 | 11/1982 | Koch | 403/231 |
| 4,518,278 | 5/1985 | Koch | 403/245 |
| 4,599,011 | 7/1986 | Tashiro et al. | 403/245 |
| 4,728,215 | 3/1988 | Martincic et al. | 403/231 |

Primary Examiner—Andrew V. Kundrat
Assistant Examiner—Carol I. Bordas
Attorney, Agent, or Firm—Wenderoth, Lind & Ponack

[57] ABSTRACT

A fitting for releasably connecting two plate-shaped furniture parts meeting at a right angle includes a bolt anchorable in a dowel casing in a furniture part and having a head acted upon by an eccentric bushing which is mounted without an axle in the other furniture part. The bolt is anchored in the dowel casing by a disc which is held in the dowel casing for displacement in a plane transverse or vertical to the bolt. The dowel casing has at a side thereof facing the other furniture part an opening which is of greater size than the diameter of the bolt.

5 Claims, 1 Drawing Sheet

FURNITURE CONNECTOR

FIELD AND BACKGROUND OF THE INVENTION

The invention relates to a fitting for releasably connecting two plate-shaped furniture parts meeting at a right angle, comprising a bolt anchorable in a first furniture part by means of a cylindrical dowel casing and having a head acted upon by an eccentric bushing which is mounted without axle in the second furniture part and has two at least substantially spirally extending holding edges, said bolt in the first furniture part projecting into the front side of the dowel casing.

A fitting of this kind is known from GB-PS 964 917. AT-PS 382 434 describes a similar fitting.

By means of a fitting of the above-mentioned kind, two furniture parts which meet at a right angle can be fastened and clamped to each other, which does not only guarantee a firm fit of the furniture parts but also improve the stability of the piece of furniture. Conventional eccentric bushings are generally made of cast metal alloys or of injection-molded plastics material. They may also be of sheet steel, as described in the above-cited AT-PS.

It is a disadvantage of prior art furniture connectors that the bores in the two furniture parts which receive the bolt and the eccentric bushing have to be drilled very precisely since later displacement of the two furniture parts in respect of each other is not possible. The bores define the exact position of the furniture parts in respect of each other.

Particularly for the mounting of drawer front plates to furniture side walls, in additional adjusting of the plate has proved necessary and desirable, after fitting of the drawer into the body of the piece of furniture.

It is therefore the object of the invention to improve a fitting of the above-mentioned kind to provide, in furniture parts which are anchored to each other, a possibility of adjusting the furniture parts in at least one plane before the clamping operation.

SUMMARY OF THE INVENTION

The task set by the invention is solved in that the bolt in the dowel casing of the first furniture part is anchored by means of a disc or the like which is displaceably held in the dowel casing in a plane vertically aligned in respect of the bolt, and that the dowel casing has an opening at its front side which is greater than the diameter of the bolt extending into the dowel casing.

It is advantageously provided that the bolt has a threaded shoulder which is screwed into the female thread of the disc.

A further embodiment of the invention provides that the disc has two wings which project into lateral recesses of the dowel casing.

When the wings abut on the walls of the lateral recesses, the disc cannot rotate so that the bolt can be screwed into a threaded hole of the disc.

It is advantageously provided that the disc is held in groove-like recesses of the dowel casing.

BRIEF DESCRIPTION OF THE FIGURES OF THE DRAWING

In the following an embodiment of the invention will be described in more detail with reference to the figures of the drawing in which

FIG. 3 shows a drawer comprising a front plate 1, two side walls 2 and the bottom 3.

DESCRIPTION OF A PREFERRED EMBODIMENT

Figure 1:
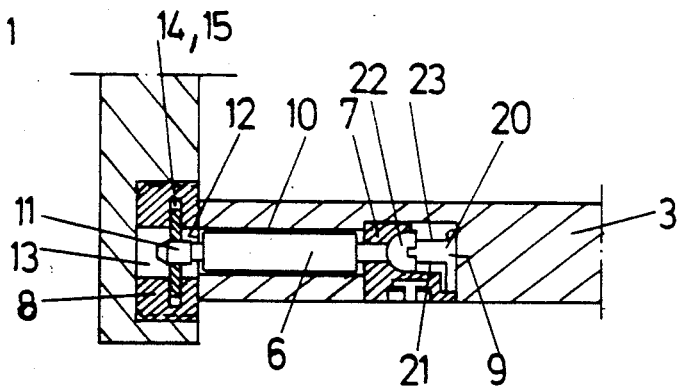
FIG. 1 shows a diagrammatic sectional view of two furniture parts which are connected by means of a fitting according to the invention.

The drawer side walls 2 are fastened to the front plate 1 by conventional holding means 4. The drawer bottom 3 advantageously abuts on horizontal flanges of the side walls 2 which are not shown.

In order to provide a very broad drawer, it is of advantage to arrange the inventive fitting 5 in the center of the front plate 1 and of the drawer bottom 3.

The inventive fitting 5 comprises the bolt 6, the eccentric bushing 7 and the dowel casing 8.

The dowel casing 8 is fitted into the side of the front plate 1. The eccentric bushing 7 is arranged in a bore 9 in the side of the drawer bottom 3. The bolt 6 projects through a bore 10 in the frontside of the drawer bottom 3.

In the dowel casing 8 the bolt 6 projects by means of a threaded shoulder 11 through an opening 12 into a cylindrical recess 13.

Groove-like recesses 14, 15 are arranged laterally in respect of the cylindrical recess 13.

A disc 16 is displaceably held in the groove-like recesses 14,15.

The disc 16 is provided with a threaded bore 17 into which the threaded shoulder 11 of the bolt 6 can be screwed.

The disc 16 has lateral wings 18 which limit the possible rotation of the disc 16. The wings 18 touch side walls 19 of the recesses 15.

The bolt 6 projects through the bore 10 in the front side of the drawer bottom 3 into the bore 9 in the side of the drawer bottom 3. As already mentioned, the eccentric bushing 7 is fitted into the bore 9 at the side of the drawer bottom 3.

The eccentric bushing 7 has an opening 20 and a slot 21 on its outer surface through which the bolt 6 projects with its head 22.

The head 22 engages behind substantially spirally extending holding edges 23, and the bolt 6 is, when the eccentric bushing 7 is turned into the clamping position, fastened in the direction of arrow A of FIG. 1. Thus, the front plate 1 is clamped to the drawer bottom 3.

Figure 2:
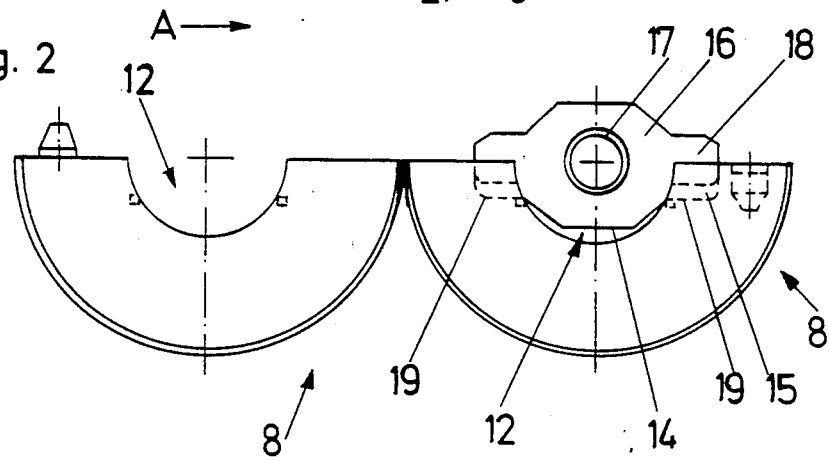
FIG. 2 shows a top view of the dowel casing according to the invention in the clapped-open position.
Figure 3:
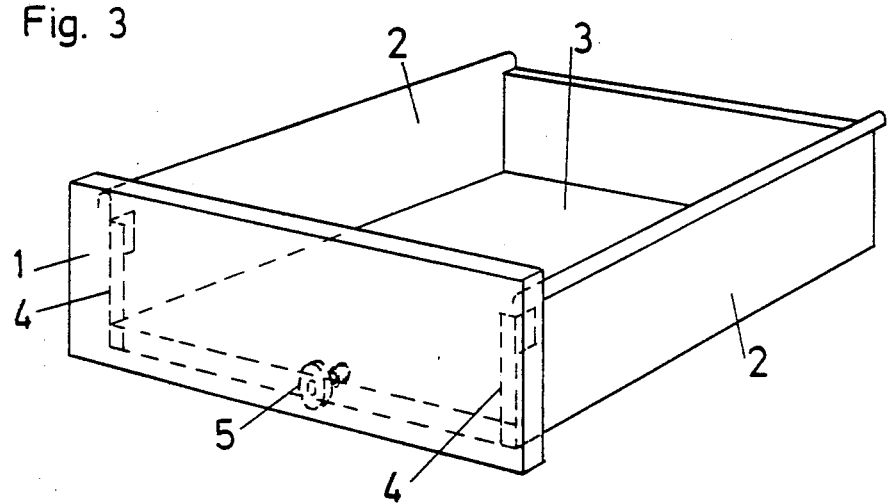
FIG. 3 shows a diagrammatic view of a drawer which is provided with a fitting according to the invention.

As can be seen from FIGS. 1 and 2, the recesses 14,15 are greater than the disc 16 so that the latter-mentioned is held in the dowel casing 8 with lateral clearance. Hence, an adjustment of the front plate 1 in respect of the drawer bottom 3 is possible, when the bolt 6 is screwed into the disc 16 and held in the eccentric bushing 7 with its head 22, as long as the eccentric bushing 7 is not in its clamping position.

The arrangement of the fitting 5 does therefore not impair the adjustment of the front plate in respect of the drawer side walls 2 and the drawer bottom 3 which is possible by means of the holding means 4.

The dowel head 8 is made of injection-molded plastics material and comprises two cups which can be clapped together to facilitate insertion of the disc 16. The disc 16 is preferably of metal.

What is claimed is:

1. In a fitting for releasably connecting two plate-shaped furniture parts meeting at a right angle, said fitting including a bolt anchorable in a first furniture part by a cylindrical dowel casing and having a head acted on by an eccentric bushing to be mounted in a second furniture part, the improvement comprising:

a disc member connected to said bolt and mounted in said dowel casing for displacement relative thereto in a plane extending transversely of the longitudinal axis of said bolt; and said dowel casing having in a side thereof to be directed toward the second furniture part an opening of a size greater than the diameter of that portion of said bolt extending into said dowel casing.

2. The improvement claimed in claim 1, wherein said bolt has a threaded portion threaded into female threads formed in a bore in said disc member.

3. The improvement claimed in claim 1, wherein said disc member has extending therefrom at least one lateral wing fitting into a lateral recess in said dowel casing, thereby preventing rotation of said disc member relative to said dowel casing.

4. The improvement claimed in claim 3, wherein said disc member has two said lateral wings fitting into respective said lateral recesses in said dowel casing.

5. The improvement claimed in claim 1, wherein said disc member is mounted within groove-like recesses formed in said dowel casing.

* * * * *